Oct. 29, 1929.    C. J. EVERLINE    1,733,119
LICENSE PLATE HOLDER
Filed Oct. 1, 1928
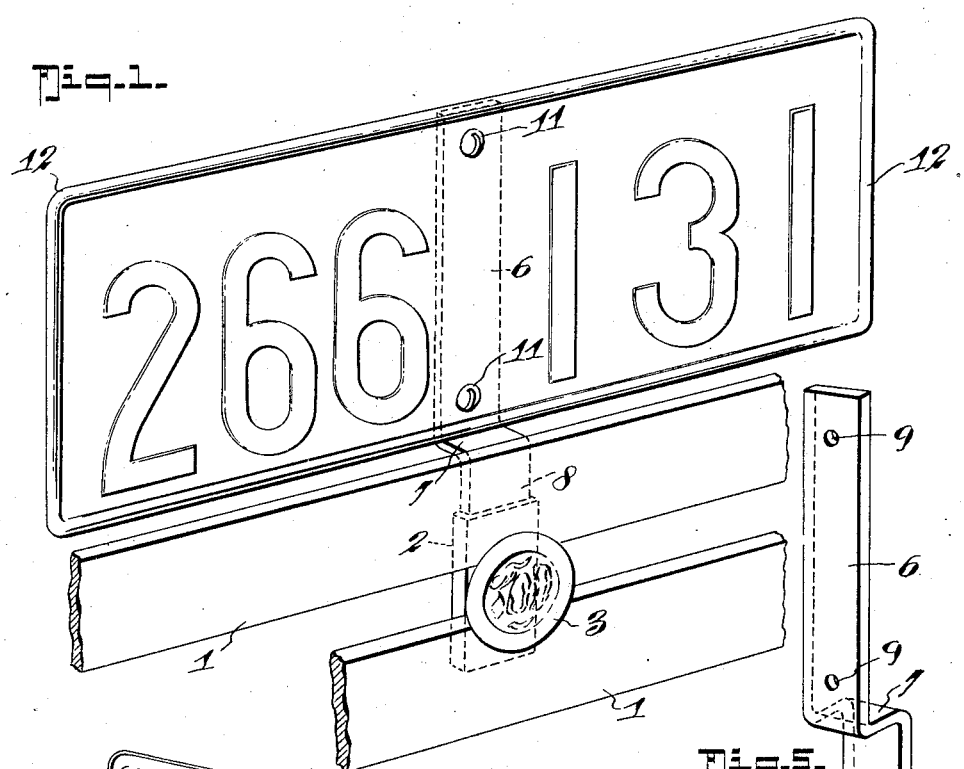
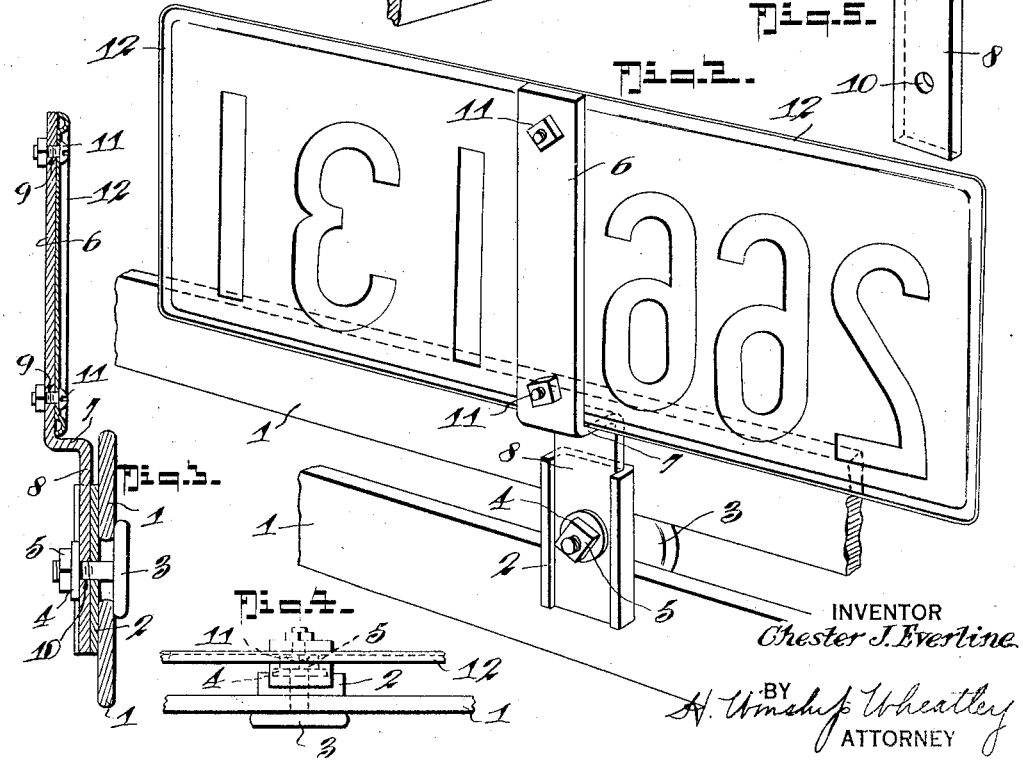

Patented Oct. 29, 1929

1,733,119

UNITED STATES PATENT OFFICE

CHESTER J. EVERLINE, OF CUMBERLAND, MARYLAND

LICENSE-PLATE HOLDER

Application filed October 1, 1928. Serial No. 309,471.

The invention relates to improvements for securing a license plate on an automobile, and it particularly has for an object to provide a simple, inexpensive device which is especially adapted for use on the new model Ford cars. These cars are usually equipped with front bumpers of the parallel bar type, the bars at the center being connected by a channeled upright on their rear face, and a bolt with ornamental head, which passes between the bars of the bumper and through a hole in the channelled upright, the parts being secured by a washer and nut.

My invention involves the utilization of this channeled upright, together with the bolt for holding a bracket of strap iron which is stepped back and extended above the bumper a distance sufficient to fit against the back face of the license plate when the lower edge of the plate is flush with or slightly below the top of the bumper.

Further the invention has for an object the provision of a license plate holder that will be invisible from the front of the machine and will require no marring or scratching of the bumper and which will touch the metal of the bumper structure at one place only thereby preventing rattles.

To the attainment of the aforesaid objects and ends the invention resides in those novel features of construction, combination and arrangement of parts, all of which will be first fully described, then be specifically pointed out in the appended claims, reference being had to the accompanying drawing, in which:

Figure 1 is a perspective view of a part of a bumper with the invention applied, looking at the same from the front.

Figure 2 is a perspective view of the same looking at the rear.

Figure 3 is a central vertical longitudinal section.

Figure 4 is a plan view of the parts shown in Figures 1, 2 and 3.
Figure 5 is a perspective view of the license plate holder, per se.

In the drawing, in which like numerals of reference indicate like parts in all of the figures, 1—1 represent the two bars of the bumper, 2 the channeled upright and 3 the ornamental head bolt. 4 is a washer and 5 the nut on the bolt 3.

My invention consists of a bracket formed of strap iron consisting of a short portion 8 and a long portion 6, the latter being stepped back from the portion 8 as at 7. The portion 8 is apertured at 10 to receive the bolt 3 and when the parts are assembled it lies in the channeled member 2.

The part 6 is apertured top and bottom at 9 to receive screw bolts 11 that pass through the license plate 12 and secure the license plate to the part 6 of the brackets.

Thus, it will be seen that in order to use my invention all that is necessary is to release the nut 5 and washer 4 and place the portion 8 of the bracket in the channelled member 2 with its hole 10 registering with the hole in the channeled member through which the bolt 3 projects, and then replace the washer and nut and tighten up on the same. The license plate is secured to the member 6, as before described, and as will be clear from Figure 1 no part of the bracket is visible from the front of the machine and thus does not detract from the appearance of the car.

By the use of my invention the license plate may be held a considerable distance in front of the radiator of the car so as not to interfere with the proper passage of air through the radiator for cooling purposes. Where the license plate is located closed to the radiator either by attachment to the frame or to the front apron, or to the cross bar of the light brackets, or to the radiator itself, the circulation of air is more or less interfered with, thus reducing the efficiency of the radiator and tending to permit heating of the engine.

With my invention, however, the license plate may be carried in a clearly visible way on the bumper and yet be spaced back of the plane of the bumper so as not to be injured by ordinary contact between the bumper and an obstruction in front of the car as, for example, the bumper of an adjacent car in parking space.

What I claim is:

1. In combination with a bumper having a channelled upright and a bolt with nut passing through the bumper and upright, of a bracket comprising a bar having a portion to fit in said channelled upright and apertured to receive said bolt, and having an extension with spaced apertures to fit a license plate and fastening bolts passing through said spaced apertures and license plate substantially as specified.

2. In combination with a bumper having a channelled upright and a bolt with nut passing through the bumper and upright, of a bracket comprising a bar having a portion to fit in said channeled upright and apertured to receive said bolt, and having an extension with spaced apertures to fit a license plate and fastening bolts passing through said spaced apertures and license plate, said bracket bar being offset to the rear of the bumper to hold the license plate in a vertical plane in the rear of the vertical plane containing the bumper bars.

CHESTER J. EVERLINE.